(12) United States Patent
Veine et al.

(10) Patent No.: US 7,975,360 B2
(45) Date of Patent: Jul. 12, 2011

(54) HEAD RESTRAINT SUPPORT COMPONENT FOR A VEHICLE SEAT

(75) Inventors: Eric Veine, Wixom, MI (US); Gerald Locke, Lake Orion, MI (US); Mark A. Farquhar, Ortonville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 12/689,448

(22) Filed: Jan. 19, 2010

(65) Prior Publication Data

US 2010/0115754 A1    May 13, 2010

Related U.S. Application Data

(62) Division of application No. 12/243,602, filed on Oct. 1, 2008, now Pat. No. 7,661,758.

(51) Int. Cl.
*B23P 11/02* (2006.01)
*B60N 2/44* (2006.01)

(52) U.S. Cl. ...................... 29/453; 297/463.2
(58) Field of Classification Search .......... 297/452.18, 297/452.2, 404, 408, 216.12, 397, 399, 463.2; 29/428, 453

See application file for complete search history.

(56) References Cited

U.S. PATENT DOCUMENTS

| | | |
|---|---|---|
| 4,840,428 A | 6/1989 | Kobayashi et al. |
| 5,397,170 A | 3/1995 | Shrock |
| 5,547,259 A | 8/1996 | Fredrick |
| 5,671,976 A | 9/1997 | Fredrick |
| 5,820,211 A | 10/1998 | Heilig et al. |
| 5,938,279 A | 8/1999 | Schubring et al. |
| 6,007,154 A | 12/1999 | Parker et al. |
| 6,022,078 A | 2/2000 | Chang |
| 6,033,020 A | 3/2000 | Ito |
| 6,955,397 B1 | 10/2005 | Humer |
| 7,114,780 B1 | 10/2006 | Lee et al. |
| 7,201,443 B2 | 4/2007 | Cilluffo et al. |
| 7,204,552 B2 * | 4/2007 | Ishizuka .................. 297/216.12 |
| 7,213,887 B2 | 5/2007 | Dudash et al. |
| 7,445,289 B2 * | 11/2008 | Neale ............................. 297/408 |
| 2009/0001751 A1 | 1/2009 | Doxey et al. |
| 2009/0179468 A1 * | 7/2009 | Orzelski et al. .......... 297/216.12 |

FOREIGN PATENT DOCUMENTS

| | | |
|---|---|---|
| DE | 60307083 T2 | 2/2007 |
| FR | 2765842 A1 | 1/1991 |
| JP | 1006-26140 A2 | 2/2006 |

OTHER PUBLICATIONS

German Patent Office for corresponding Application No. 10 2009 039 154.1, mailed Apr. 22, 2010, 2 pages.

* cited by examiner

*Primary Examiner* — Milton Nelson, Jr.
(74) *Attorney, Agent, or Firm* — Brooks Kushman P.C.

(57) ABSTRACT

A vehicle seat assembly is provided with a seat frame adapted to be mounted within a vehicle. The seat frame has a tubular upper cross member. A bracket member is mounted to the tubular upper cross member of the seat frame. The bracket member has a pair of fulcrum bushings integrally formed therein. The bracket member is attached to onto the tubular upper cross member by an interference fit. At least one support rod is sized to be received within each of the pair of fulcrum bushings. At least one head restraint post is sized to be received within the at least one support rod. An active head restraint is mounted to the at least one head restraint post.

19 Claims, 4 Drawing Sheets

HEAD RESTRAINT SUPPORT COMPONENT FOR A VEHICLE SEAT

This application is a division of U.S. application Ser. No. 12/243,602 filed Oct. 1, 2008, now issued as U.S. Pat. No. 7,661,758 issued Feb. 16, 2010.

BACKGROUND

1. Technical Field

Multiple embodiments relate to frames and head restraint supports for vehicle seat assemblies.

2. Background Art

Vehicle seats having frames are often provided with movable head restraints mounted to the vehicle frames for moving to an impact position in response to a signal or force imparted to the seat before or during an impact condition. One example of a vehicle seat having a movable head restraint is disclosed in U.S. Pat. No. 7,044,544, which issued on May 16, to Humer et. al.

DETAILED DESCRIPTION OF EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

In prior art vehicle seats without active head restraints a first seat frame is employed that mounts the fixed head restraint to the first seat frame. In prior art vehicle seats with active head restraints, a second seat frame, which may be specially designed, is employed to mount the active head restraint to the second seat frame. Alternatively, the first seat frame may be significantly modified to mount the active head restraint to the first seat frame. Separate components must be utilized to mount the active head restraint to the first seat frame, which increases complexity of the vehicle seats and can increase manufacturing costs. The disclosed embodiments provide a vehicle seat, illustrated in FIG. 1 as numeral 10, which allow for a single seat frame to be utilized when mounting an active head restraint to the seat frame or when mounting the fixed head restraint to the seat frame, as discussed further below.

Figure 1:
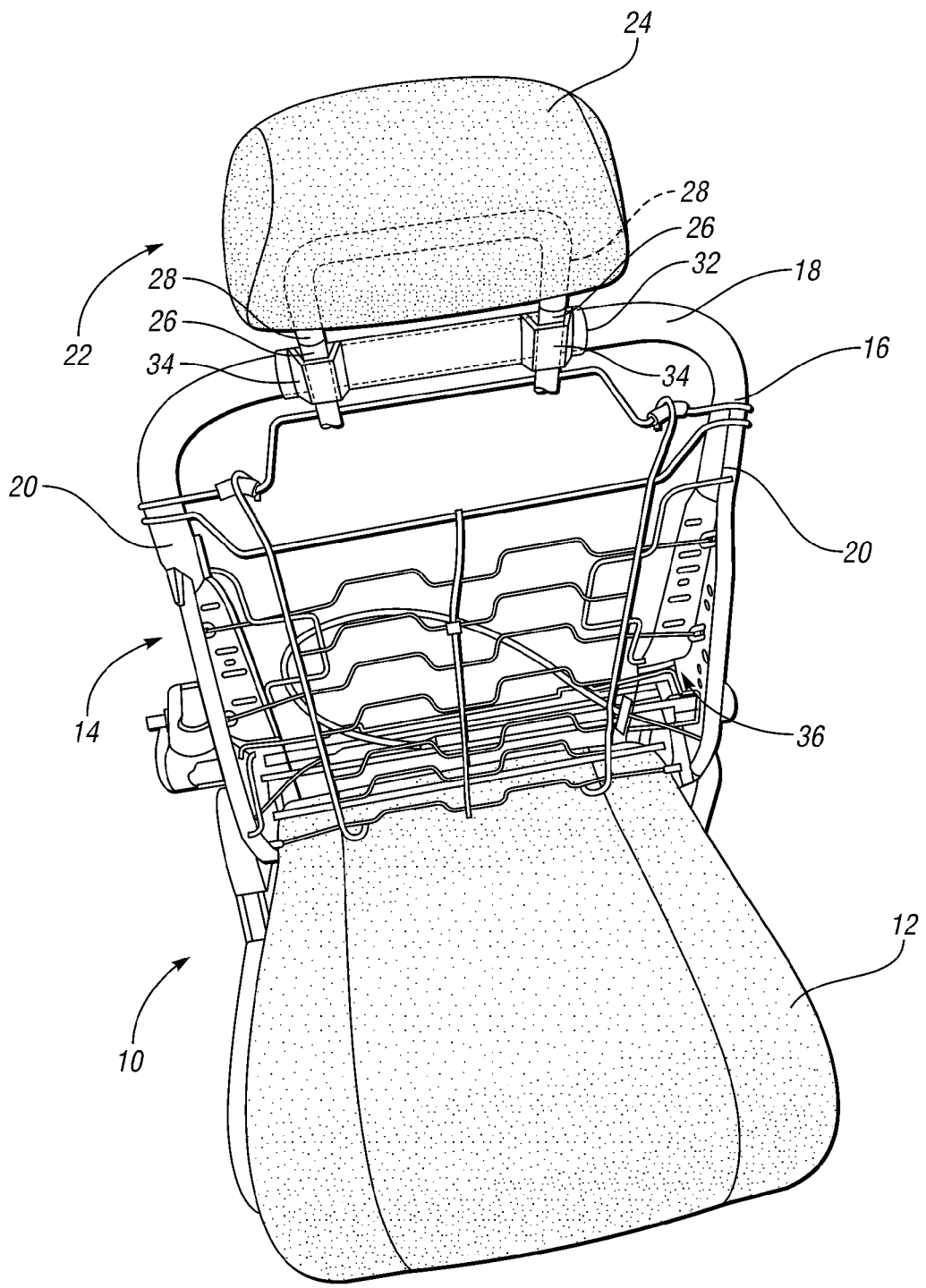
FIG. 1 is a perspective view of a vehicle seat assembly.

Referring to FIG. 1, a vehicle seat is illustrated and referenced generally by numeral 10. The vehicle seat includes a seat bottom 12 secured to a floor of an associated vehicle for seating an occupant upon the seat bottom 12. A seat back 14 extends from the seat bottom 12 and is secured relative to the seat bottom 12 for supporting a back of the occupant against the seat back 14. The seat back 14 may pivot relative to the seat bottom 12 to permit ingress and egress to and from a rear seating row and/or to permit an occupant to select a comfortable riding position while sitting in the vehicle seat 10.

In one embodiment, the seat back 14 includes a frame 16 for providing structural support for the seat back 14. The frame 16 includes a tubular upper cross member 18 that may be connected to side members 20. In at least one embodiment, the side members 20 are integrally formed with the tubular upper cross member 18.

The seat back 14 is illustrated with a cover and cushioning removed to show internal components. The cushioning may include foam, padding, bolsters and/or support wires. The cover may rest over the cushioning to conceal the cushioning. Any suitable cushioning and cover such as those known in the art may be mounted on the frame 16.

As illustrated, a head restraint assembly 22 is mounted to the frame 16 of the seat back 14. The head restraint assembly 22 has a head restraint 24 supported by head restraint posts 28. The head restraint assembly 22 need not be directly mounted to the frame 16 of the seat back 14 and may be mounted indirectly to the seat back 14. The head restraint posts 28 may be sized to be received within support rods 26 to mount to head restraint assembly 22 to the frame 16. The support rods 26 may move the head restraint assembly 22 relative to the seat back 14. Additionally, relative movement between the head restraint posts 28 and the support rods 26 may allow for height adjustment of the head restraint assembly 22. The support rods 26 and the head restraint posts 28 may be constructed from metal tubes or rods that can be bent as desired. Of course, any suitable material for the support rods 26 and the head restraint posts 28 may be employed. In at least one embodiment, the head restraint posts 28 are integrally formed with the support rods 26. The support rods may be further defined as vertically oriented upright support rods 26. In at least one embodiment, which is illustrated in FIG. 2, the upright support rods 26 are interconnected by a substantially horizontally oriented crossbar portion 30.

In at least one embodiment illustrated in FIG. 1, a bracket member 32 is mounted to the crossbar portion 18 of the frame 16 and receives the upright support rods 26 to mount the head restraint assembly 22 to the frame 16. The bracket member 32 is employed to reinforce the crossbar portion 18 of the frame 16 and may be employed when the head restraint posts 28 are not welded to the crossbar portion 18 of the frame 16. The bracket member 32 may have fulcrum bushings 34 provided therein to receive the upright support rods 26. In at least one embodiment, the fulcrum bushings 34 are integrally formed within the bracket member 32. The fulcrum bushings 34 of the bracket member 32 allow translation and/or rotation of the upright support rods 26, as discussed below.

In the depicted embodiment, the head restraint 24 is an active head restraint 24 to move between the design position, illustrated, to an extended position in any suitable manner. A mechanical actuator 36 may be mounted within the seat back 14 to move the head restraint 24 via translation and/or rotation of the upright support rods 26 within the fulcrum bushings 34. An example of an active head restraint and a mechanical actuator is disclosed in U.S. Pat. No. 7,044,544, which issued on May 16, to Humer et. al and is incorporated by reference herein. In one embodiment, the mechanical actuator is an adjustable lumbar support 36 for providing lumbar support to the occupant, while providing adjustability so that the occupant can select a desired level of comfort and support. The lumbar support 36 may be an input to produce an output movement of the head restraint 24 to the extended position. The lumbar support 36 can be connected to the head restraint 24 so that upon receipt of an impact to the lumbar support 36, such as a body of the occupant that exceeds a predetermined force. The lumbar mechanism 36 then moves the upright support rods 26 in a suitable manner, so that the head restraint 22 is rotated and/or translated forward and/or upward relative to the seat back 14. In at least one embodiment, the lumbar mechanism 36 illustrated is connected to the crossbar member 30, shown in FIG. 3. Of course, any suitable active head restraint assembly 22 and actuator 36 is contemplated within the scope of the disclosed embodiments.

Figure 2:
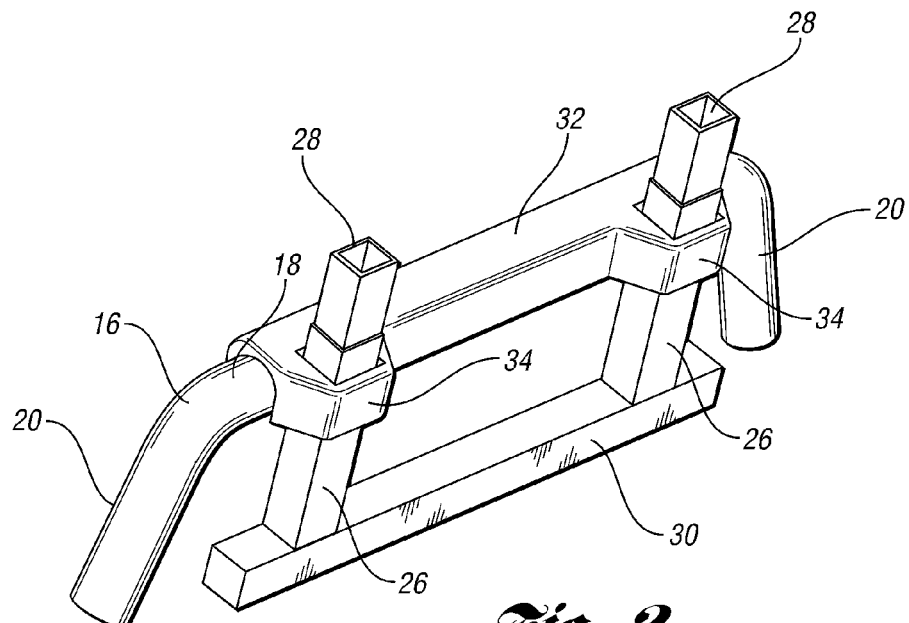
FIG. 2 is a front perspective view of an embodiment of a portion of the vehicle seat assembly of FIG. 1.
Figure 3:
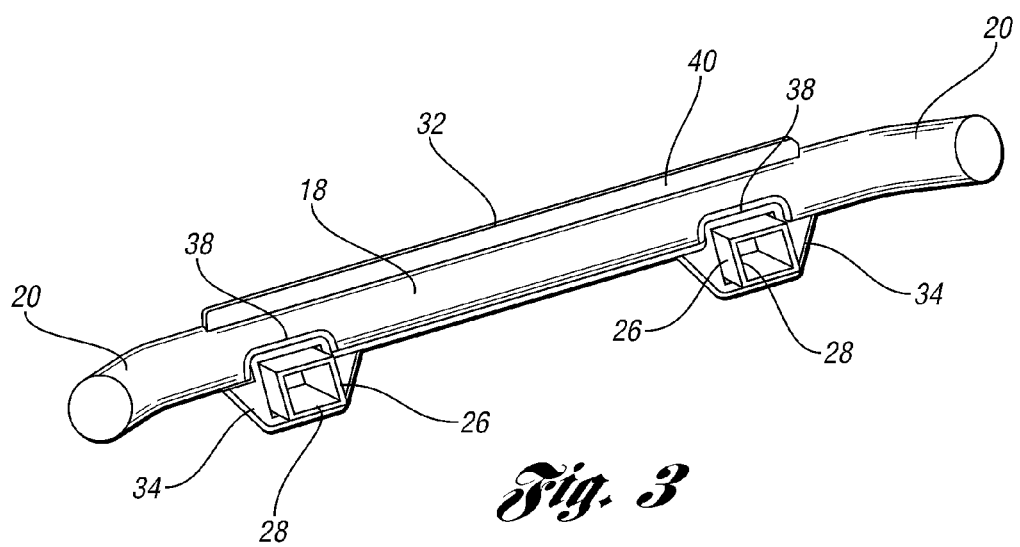
FIG. 3 is a bottom perspective view of the portion of the vehicle seat assembly of FIG. 2.
Figure 4:
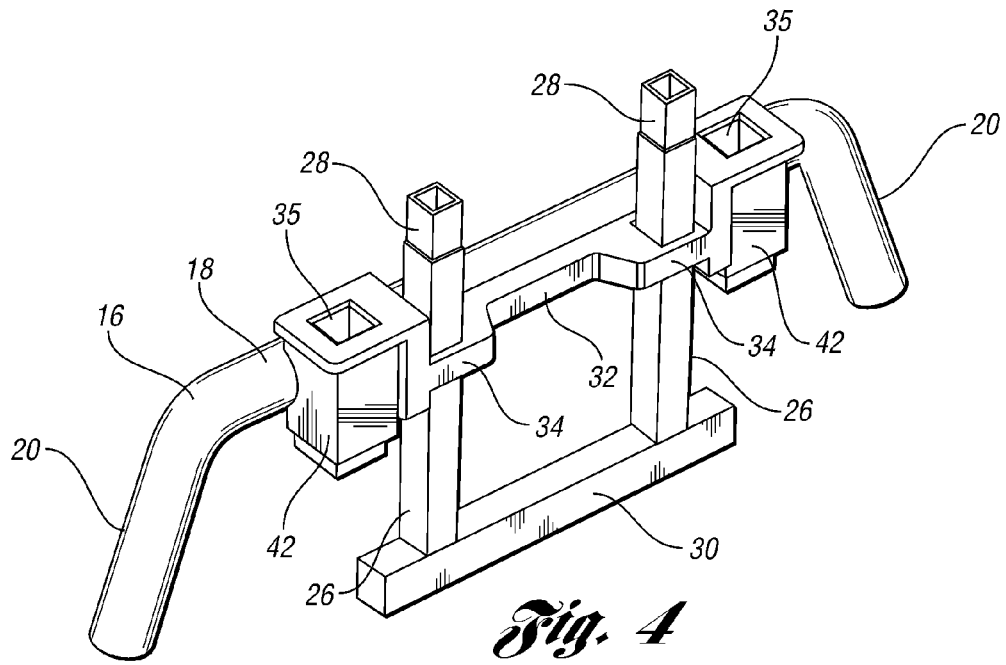
FIG. 4 is a front perspective view of another embodiment of a portion of the vehicle seat assembly of FIG. 1.

With reference now to FIGS. 2-4, the bracket member 32 is mounted to the crossbar portion 18 of the seat frame 16 and upright support rods 26 are mounted within the bushings 34 of the bracket member 32. The bracket member 32 may be mounted to the crossbar portion of the frame 16 by an interference fit such as a snap-fit, which reduces complexity of manufacturing and the production costs of the vehicle seat 10. In one embodiment, the bracket member 32 is formed out of a plastic material, which may have a light weight when compared to a metal material.

In prior art vehicle seats with active head restraints and an actuator within the seat back, mounting the head restraint assembly to the seat frame requires significant manufacturing processes. A cross member of the seat frame may require significant modification to implement an active head restraint and an actuator within the seat back. A separate fulcrum bracket is welded to the tubular upper cross member to support the tubular upper cross member and additional fulcrum bushings are added to the tubular upper cross member in order to mount the head restraint posts to the seat frame. The bracket member 32 combines the fulcrum bracket and additional fulcrum bushings while reducing manufacturing costs.

In FIGS. 2-3, the crossbar portion 18 of the seat frame 16 has a pair of recesses 38 formed therein. As illustrated in FIG. 3, the recesses 38 are sized to receive the bushings 34 of the bracket member 32. The recesses 38 provide guidance when the bracket member 32 is mounted on the crossbar portion 18 of the seat frame 16. The bracket member 32 may be retained within and stabilized by the recesses 38 to minimize movement of the bracket member 32 and center the load placed on the bracket member 32 from the head restraint assembly via the upright support rods 26 connected to the head restraint posts 28. Although a pair of recesses 38 is illustrated, any suitable amount of recesses 28 is contemplated within the scope of the disclosed embodiments.

Figure 6:
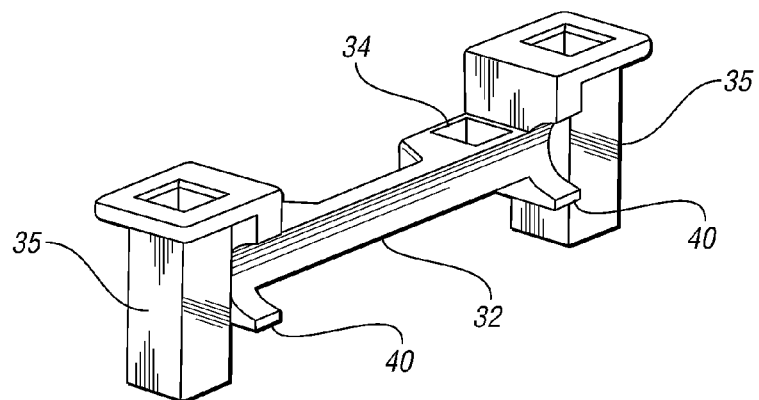
FIG. 6 is a rear perspective view of FIG. 5.

In FIG. 3, a fastener 40 is formed within the bracket member 32 to mount the bracket member 32 to the crossbar portion 18 of the seat frame 16. The fastener 40 is provided so that the bracket member 32 can be mounted to the crossbar portion 18 of the seat frame 16 without implementation of additional manufacturing steps such as welding or bonding. The fastener may be a clip 40, which snap-fits the bracket member 32 onto the crossbar portion 18. In FIG. 6, a pair of fasteners 40 is formed within the bracket member 32 to snap-fit the bracket member 32 to the crossbar portion 18 of the seat frame 16, as illustrated in FIG. 4. In one embodiment, the fasteners 40 are integrally formed within the bracket member 32. Of course, any suitable fasteners 40 can be implemented within the scope of the disclosed embodiments.

Figure 5:
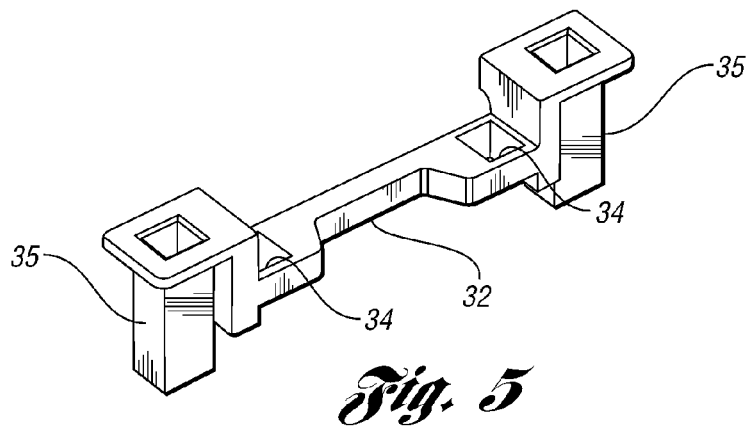
FIG. 5 is a perspective view of the portion of the vehicle seat assembly of FIG. 4.

Referring to FIG. 4, head restraint guide tubes 42 are provided on the crossbar portion 18 of the seat frame 16. The guide tubes 42 may be welded onto the crossbar portion 18. The bracket member 32 may have a pair of bushings 35 integrally formed therein to fit within the guide tubes 42. The bushings 35 are illustrated in FIGS. 5-6. The bushings 35 may facilitate attachment of the bracket member 32 to the frame 16.

As illustrated in FIGS. 4-6, a second pair of bushings 34 is integrally formed within the bracket member 32. The second pair of bushings 34 receives the upright support rods 26. The second pair of bushings 34 together provide a fulcrum point to allow both translation and/or rotation of the support rods 26 within the bushings 34 to accommodate movement of the active head restraint 24, illustrated in FIG. 1. The second pair of bushings 34 may allow both linear and non-linear movement of the support rods 26, as desired.

Figure 7:
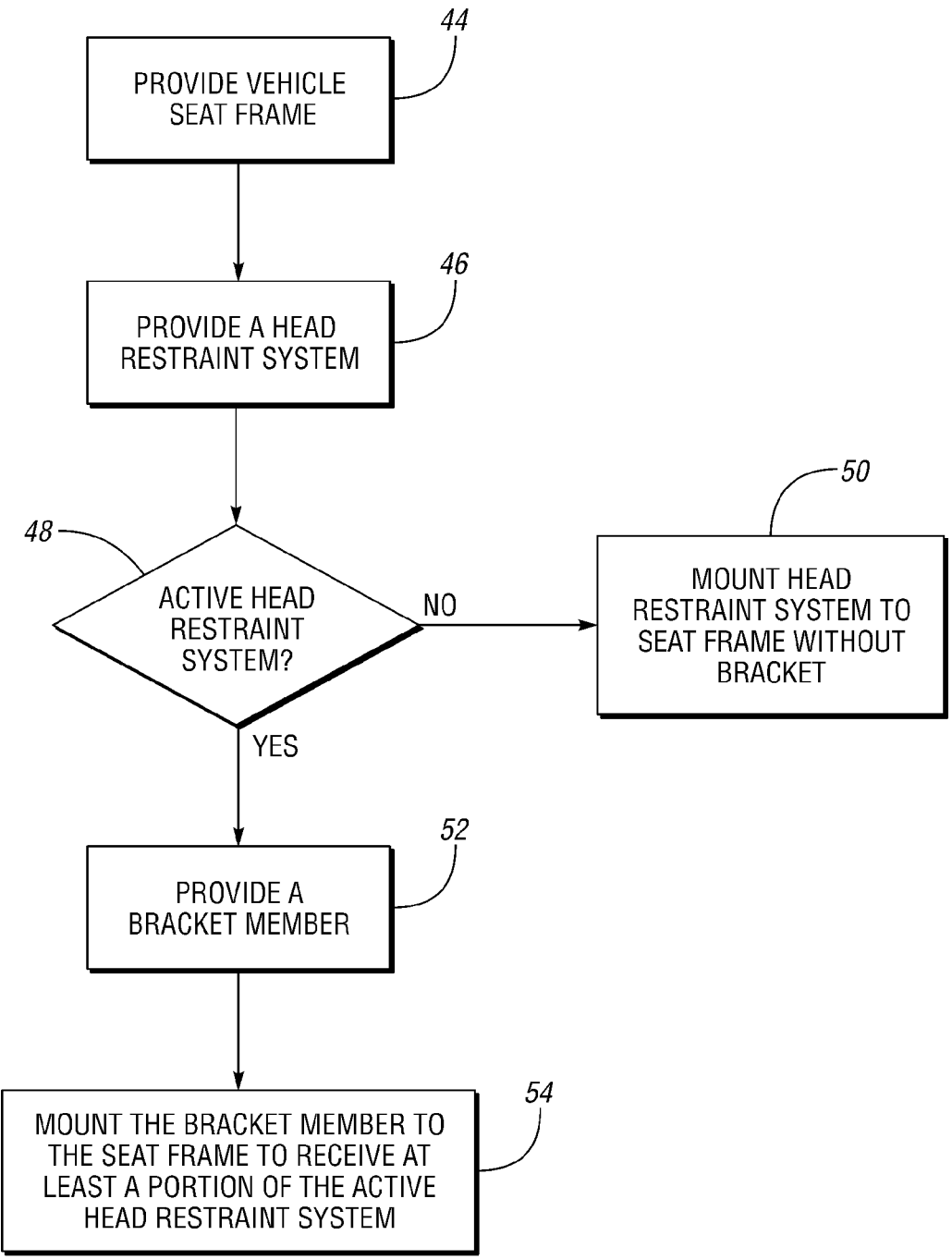
FIG. 7 is a flowchart depicting a method of manufacturing a vehicle seat.

With reference now to FIG. 7, a flowchart illustrates a method of manufacturing a vehicle seat. A vehicle seat frame is provided as a step 44 and a head restraint system is provided as another step 46. Steps 44 and 46 may be performed concurrently or in an alternate order. Once the vehicle seat frame is provided as step 44 and the head restraint system is provided as step 46, a decision is made in another step 48. In step 48, a determination is made as to whether the head restraint system is an active head restraint system. If an active head restraint system is not provided, the head restraint system can be mounted to the seat frame without a bracket, as depicted in step 50. If an active head restraint system is provided, a bracket is provided in step 52. In step 54, the bracket is mounted to the vehicle seat frame provided in step 44 to receive the active head restraint provided in step 46.

The method depicted in FIG. 7 allows a manufacturer to provide a single design for a vehicle seat frame that can receive an active head restraint system or a fixed head restraint system.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of manufacturing comprising:
   providing a vehicle seat frame;
   providing a head restraint system;
   providing a bracket member sized to be received on the vehicle seat frame without welding;
   determining if the head restraint system is an active head restraint system;
   mounting the bracket member to the vehicle seat frame if the head restraint system is an active head restraint system; and
   mounting the head restraint system to the seat frame without the bracket member if the head restraint system is not an active head restraint system.

2. The method of claim 1, wherein the head restraint system comprises an active head restraint system, the method further comprising:
   providing the head restraint system with at least one support rod;
   integrally forming the bracket member with at least one bushing sized to receive the at least one support rod; and
   mounting the at least one support rod within the at least one bushing.

3. The method of claim 2 further comprising:
   providing the head restraint system with a pair of upright support rods;

integrally forming the bracket member with a pair of bushings sized to respectively receive the pair of support rods.

4. The method of claim 3 further comprising integrally forming the bracket member with a second pair of bushings.

5. The method of claim 3 further comprising integrally forming a crossbar portion between the pair of spaced apart upright support rods.

6. The method of claim 1, wherein the head restraint system comprises an active head restraint system, the method further comprising mounting the bracket member to the vehicle seat frame by an interference fit and without welding the bracket member to the vehicle seat frame.

7. The method of claim 1, wherein the head restraint system comprises an active head restraint system, the method further comprising:
providing the vehicle seat frame with a tubular upper cross member; and
mounting the bracket member to the tubular upper cross member.

8. The method of claim 7 further comprising forming a recess within the tubular upper cross member of the seat frame to guide mounting the bracket member thereon.

9. The method of claim 7 further comprising:
forming the bracket member with at least one fastener; and
attaching the bracket member to the tubular upper cross member with a snap-fit such that the fastener flexes as the fastener slides over the tubular upper cross member and then springs back to retain the bracket member around the tubular upper cross member.

10. The method of claim 9 further comprising forming a recess within the tubular upper cross member of the seat frame to guide mounting the bracket member thereon.

11. A method of manufacturing a vehicle seat assembly, the method comprising:
providing a vehicle seat frame having a tubular upper cross member;
providing a bracket member having at least one fulcrum bushing integrally formed therein;
providing at least one support rod sized to be received within the fulcrum bushing;
providing an active head restraint with at least one head restraint post sized to be received within the support rod;
attaching the bracket member along a length of the tubular upper cross member;
mounting the at least one support rod in the at least one bushing; and
mounting the at least one head restraint post within the at least one support rod.

12. The method of claim 11 further comprising:
integrally forming the bracket member with a pair of bushings;
providing the active head restraint with a pair of support rods sized to be received in the pair of bushings.

13. The method of claim 12 further comprising integrally forming the bracket member with a second pair of bushings.

14. The method of claim 11 wherein the bracket member is attached to the tubular upper cross member by interference fit without welding.

15. The method of claim 14 further comprising:
forming the bracket member with at least one fastener; and
attaching the bracket member to the tubular upper cross member with a snap-fit such that the fastener flexes as the fastener slides over the tubular upper cross member and then springs back to retain the bracket member around the tubular upper cross member.

16. A method of manufacturing a vehicle seat assembly, the method comprising:
providing a vehicle seat frame with a tubular cross member;
providing an active head restraint system;
providing a bracket member sized to be received on the vehicle seat frame without welding;
forming the bracket member with at least one fastener;
mounting the bracket member to the tubular cross member by interference fit and not by welding wherein the interference fit is a snap-fit such that the fastener flexes as the fastener slides over the tubular cross member and then springs back to retain the bracket member around the tubular cross member; and
mounting the active head restraint system to the bracket member.

17. The method of claim 16 further comprising forming the bracket member out of plastic.

18. The method of claim 16 further comprising the steps:
providing the head restraint system with at least one support rod;
integrally forming the bracket member with at least one bushing sized to receive the at least one support rod; and
mounting the at least one support rod within the at least one bushing.

19. The method of claim 18 further comprising:
providing the head restraint system with a pair of upright support rods;
integrally forming the bracket member with a pair of bushings sized to respectively receive the pair of support rods.

* * * * *